US009444908B2

(12) United States Patent
Gooding

(10) Patent No.: US 9,444,908 B2
(45) Date of Patent: *Sep. 13, 2016

(54) DISTRIBUTING AN EXECUTABLE JOB LOAD FILE TO COMPUTE NODES IN A PARALLEL COMPUTER

(71) Applicant: International Business Machines Corporation, Armonk, NY (US)

(72) Inventor: Thomas M. Gooding, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/303,208

(22) Filed: Jun. 12, 2014

(65) Prior Publication Data

US 2015/0163287 A1    Jun. 11, 2015

Related U.S. Application Data

(63) Continuation of application No. 14/098,211, filed on Dec. 5, 2013.

(51) Int. Cl.
*G06F 15/16* (2006.01)
*H04L 29/08* (2006.01)
(Continued)

(52) U.S. Cl.
CPC ........... *H04L 67/327* (2013.01); *G06F 9/5016* (2013.01); *G06F 9/5077* (2013.01); *G06F 9/52* (2013.01); *H04L 67/32* (2013.01)

(58) Field of Classification Search
CPC .... H04L 67/10; H04L 29/08072; G06F 9/52
USPC .................................. 718/100; 709/201, 202
See application file for complete search history.

(56) References Cited

U.S. PATENT DOCUMENTS 7,596,618 B2 * 9/2009 Basu ...................... H04L 45/46
455/453
8,291,033 B2   10/2012 Archer et al.
(Continued)

FOREIGN PATENT DOCUMENTS

WO    WO 02/069550 A1    9/2002

OTHER PUBLICATIONS

U.S. Appl. No. 13/800,947, filed May 13, 2013, Aho et al.
(Continued)

*Primary Examiner* — Imad Hussain
*Assistant Examiner* — Manuel A Bravo Pagan
(74) *Attorney, Agent, or Firm* — Edward J. Lenart; Feb Cabrasawan; Kennedy Lenart Spraggins LLP

(57) ABSTRACT

Distributing an executable job load file to compute nodes in a parallel computer, the parallel computer comprising a plurality of compute nodes, including: determining, by a compute node in the parallel computer, whether the compute node is participating in a job; determining, by the compute node in the parallel computer, whether a descendant compute node is participating in the job; responsive to determining that the compute node is participating in the job or that the descendant compute node is participating in the job, communicating, by the compute node to a parent compute node, an identification of a data communications link over which the compute node receives data from the parent compute node; constructing a class route for the job, wherein the class route identifies all compute nodes participating in the job; and broadcasting the executable load file for the job along the class route for the job.

6 Claims, 10 Drawing Sheets

(51) Int. Cl.
*G06F 9/52* (2006.01)
*G06F 9/50* (2006.01)

(56) References Cited

U.S. PATENT DOCUMENTS

| | | | |
|---|---|---|---|
| 2004/0095886 A1* | 5/2004 | Nakaoka | H04L 41/0816 370/236 |
| 2005/0283766 A1* | 12/2005 | Miller | G06F 8/20 717/136 |
| 2005/0283786 A1 | 12/2005 | Dettinger et al. | |
| 2008/0209423 A1* | 8/2008 | Hirai | G06F 9/5027 718/102 |
| 2009/0094605 A1* | 4/2009 | Brelsford | G06F 9/4843 718/100 |
| 2009/0313630 A1* | 12/2009 | Hori | G06F 8/67 718/102 |
| 2010/0005472 A1* | 1/2010 | Krishnaraj | G06F 9/5038 718/104 |
| 2011/0082928 A1* | 4/2011 | Hasha | H04L 67/1095 709/224 |
| 2011/0289344 A1* | 11/2011 | Bae | G06F 11/181 714/4.2 |
| 2012/0051252 A1* | 3/2012 | Iwao | H04L 45/18 370/252 |
| 2012/0221886 A1* | 8/2012 | Barsness | G06F 9/5027 714/4.2 |
| 2014/0019508 A1* | 1/2014 | Sato | H04L 47/125 709/201 |
| 2014/0181226 A1* | 6/2014 | Xu | H04L 51/14 709/206 |
| 2015/0128150 A1* | 5/2015 | Ueda | G06F 9/5066 718/105 |

OTHER PUBLICATIONS

U.S. Appl. No. 13/801,165, filed May 13, 2013, Aho et al.

* cited by examiner

DISTRIBUTING AN EXECUTABLE JOB LOAD FILE TO COMPUTE NODES IN A PARALLEL COMPUTER

CROSS-REFERENCE TO RELATED APPLICATION

This application is a continuation application of and claims priority from U.S. patent application Ser. No. 14/098,211, filed on Dec. 5, 2013.

STATEMENT REGARDING FEDERALLY SPONSORED RESEARCH OR DEVELOPMENT

This invention was made with Government support under Contract No. 0A-45527 awarded by the Department of Energy. The Government has certain rights in this invention.

BACKGROUND OF THE INVENTION

1. Field of the Invention

The field of the invention is data processing, or, more specifically, methods, apparatuses, and products for distributing an executable job load file to compute nodes in a parallel computer that includes a plurality of compute nodes coupled for data communications over a data communications network.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include parallel computers that include a plurality of independent compute nodes. Each of the independent compute nodes may execute one or more jobs. In order to execute the one of more jobs, however, it may be necessary to load a particular compute node with computer code and data that is needed to execute the job.

SUMMARY OF THE INVENTION

Methods, apparatuses, and products for distributing an executable job load file to compute nodes in a parallel computer, the parallel computer comprising a plurality of compute nodes coupled for data communications over a data communications network, including: determining, by a compute node in the parallel computer, whether the compute node is participating in a job; determining, by the compute node in the parallel computer, whether a descendant compute node is participating in the job; responsive to determining that the compute node is participating in the job or that the descendant compute node is participating in the job, communicating, by the compute node to a parent compute node, an identification of a data communications link over which the compute node receives data from the parent compute node; constructing a class route for the job, wherein the class route identifies all compute nodes participating in the job; and broadcasting the executable load file for the job along the class route for the job.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
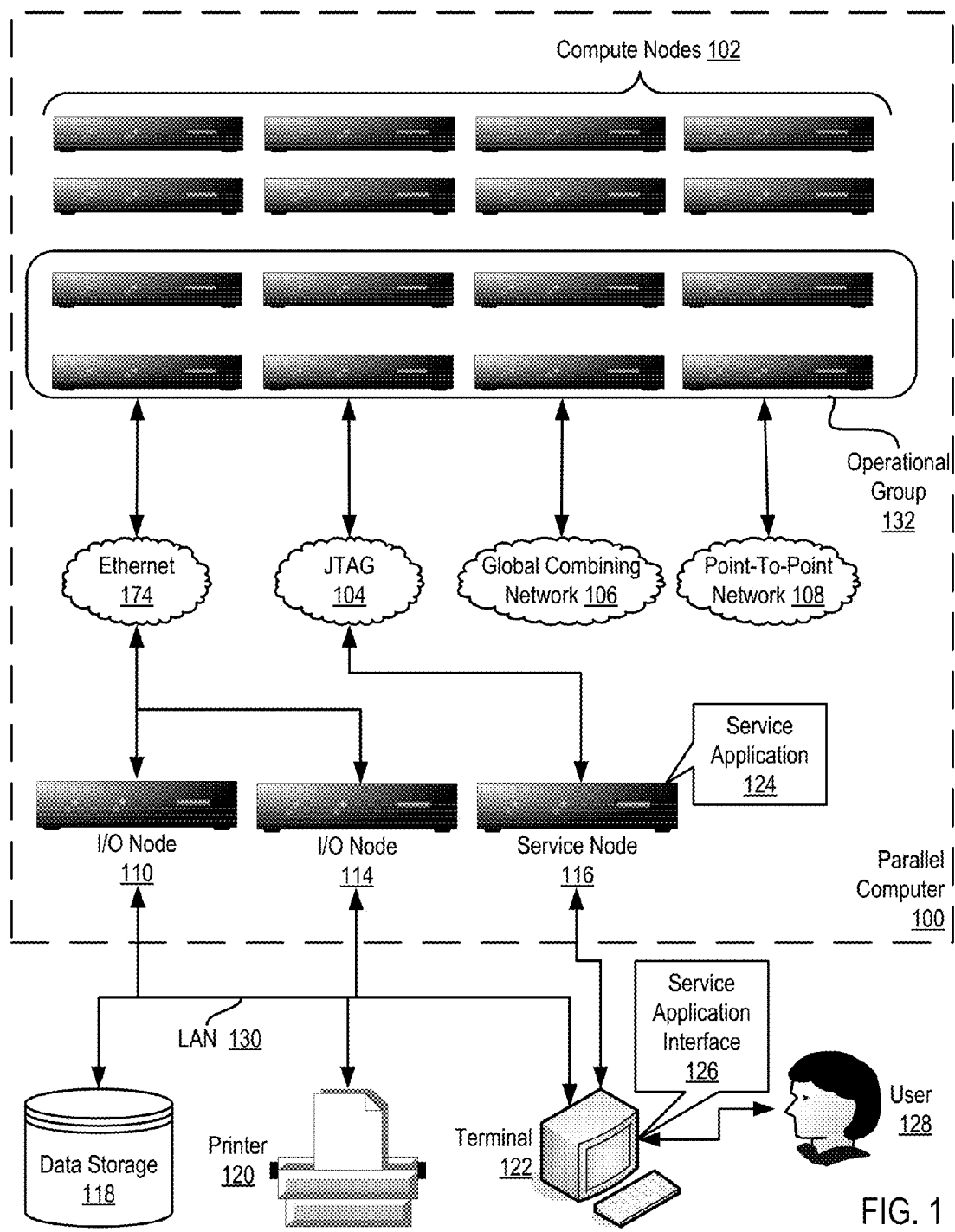
FIG. 1 illustrates an example system for distributing an executable job load file to compute nodes in a parallel computer according to embodiments of the present invention.

Example methods, apparatuses, and products for distributing an executable job load file to compute nodes in a parallel computer in accordance with the present invention are described with reference to the accompanying drawings, beginning with FIG. 1. FIG. 1 illustrates an example system for distributing an executable job load file to compute nodes in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for distributing an executable job load file to compute nodes in a parallel computer in accordance with embodiments of the present invention. As mentioned above, some parallel application may be split into parallel processes or parallel tasks. For simplicity in this specification a single compute node is often described as executing a single task. Readers will understand however that a compute node may execute in any number of tasks. In the example of FIG. 1, each compute node (102) may execute a number of tasks where at least one of the compute nodes executes a number of tasks that is different than the number of tasks executed by another one of the compute nodes.

Distributing an executable job load file to compute nodes according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of distributing an executable job load file to compute nodes according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Figure 2:
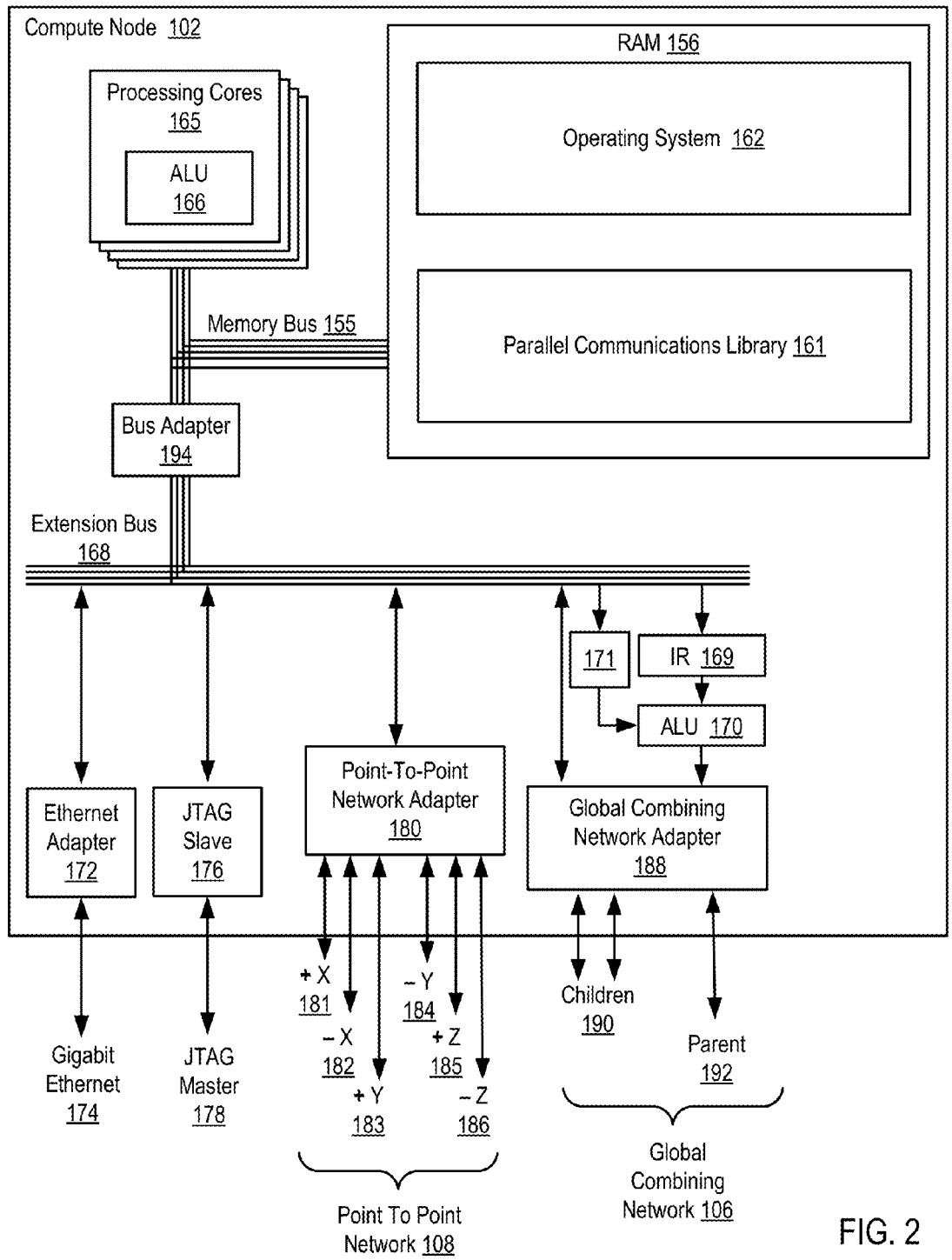
FIG. 2 sets forth a block diagram of an example compute node useful in a parallel computer capable of distributing an executable job load file to compute nodes according to embodiments of the present invention.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for distributing an executable job load file to compute nodes in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for distributing an executable job load file to compute nodes in a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output.

The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3:
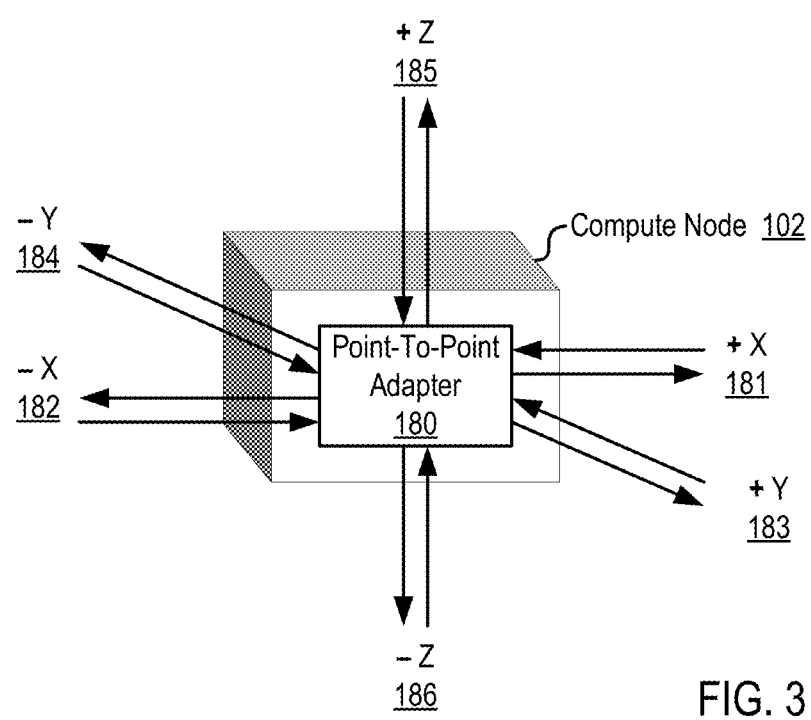
FIG. 3 sets forth a block diagram of an example Point-To-Point Adapter useful in systems for distributing an executable job load file to compute nodes in a parallel computer according to embodiments of the present invention.

For further explanation, FIG. 3 sets forth a block diagram of an example Point-To-Point Adapter (180) useful in systems for distributing an executable job load file to compute nodes in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3 provides data communication along an x-axis through four unidirectional data communications links, to and from the next node in the −x direction (182) and to and from the next node in the +x direction (181). The Point-To-Point Adapter (180) of FIG. 3 also provides data communication along a y-axis through four unidirectional data communications links, to and from the next node in the −y direction (184) and to and from the next node in the +y direction (183). The Point-To-Point Adapter (180) of FIG. 3 also provides data communication along a z-axis through four unidirectional data communications links, to and from the next node in the −z direction (186) and to and from the next node in the +z direction (185).

Figure 4:
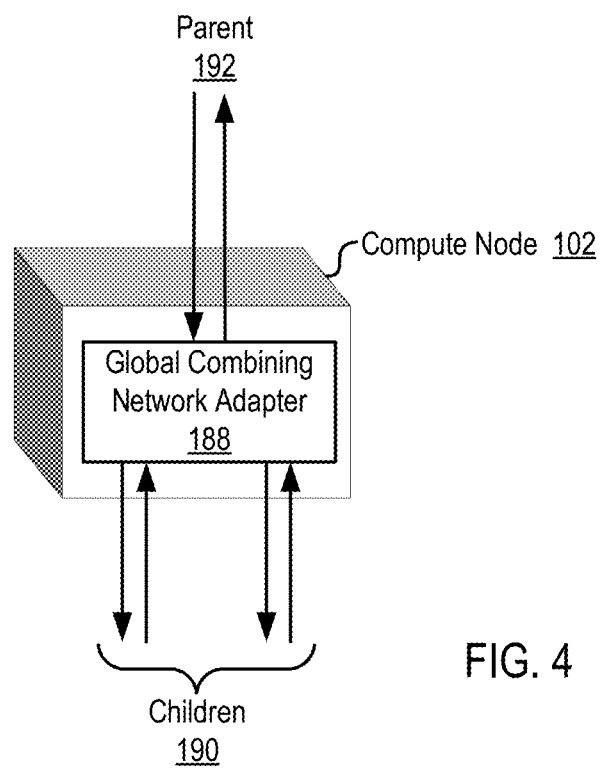
FIG. 4 sets forth a block diagram of an example Global Combining Network Adapter useful in systems for distributing an executable job load file to compute nodes in a parallel computer according to embodiments of the present invention.

For further explanation, FIG. 4 sets forth a block diagram of an example Global Combining Network Adapter (188) useful in systems for distributing an executable job load file to compute nodes in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 4 provides data communication to and from children nodes of a global combining network through four unidirectional data communications links (190), and also provides data communication to and from a parent node of the global combining network through two unidirectional data communications links (192).

Figure 5:
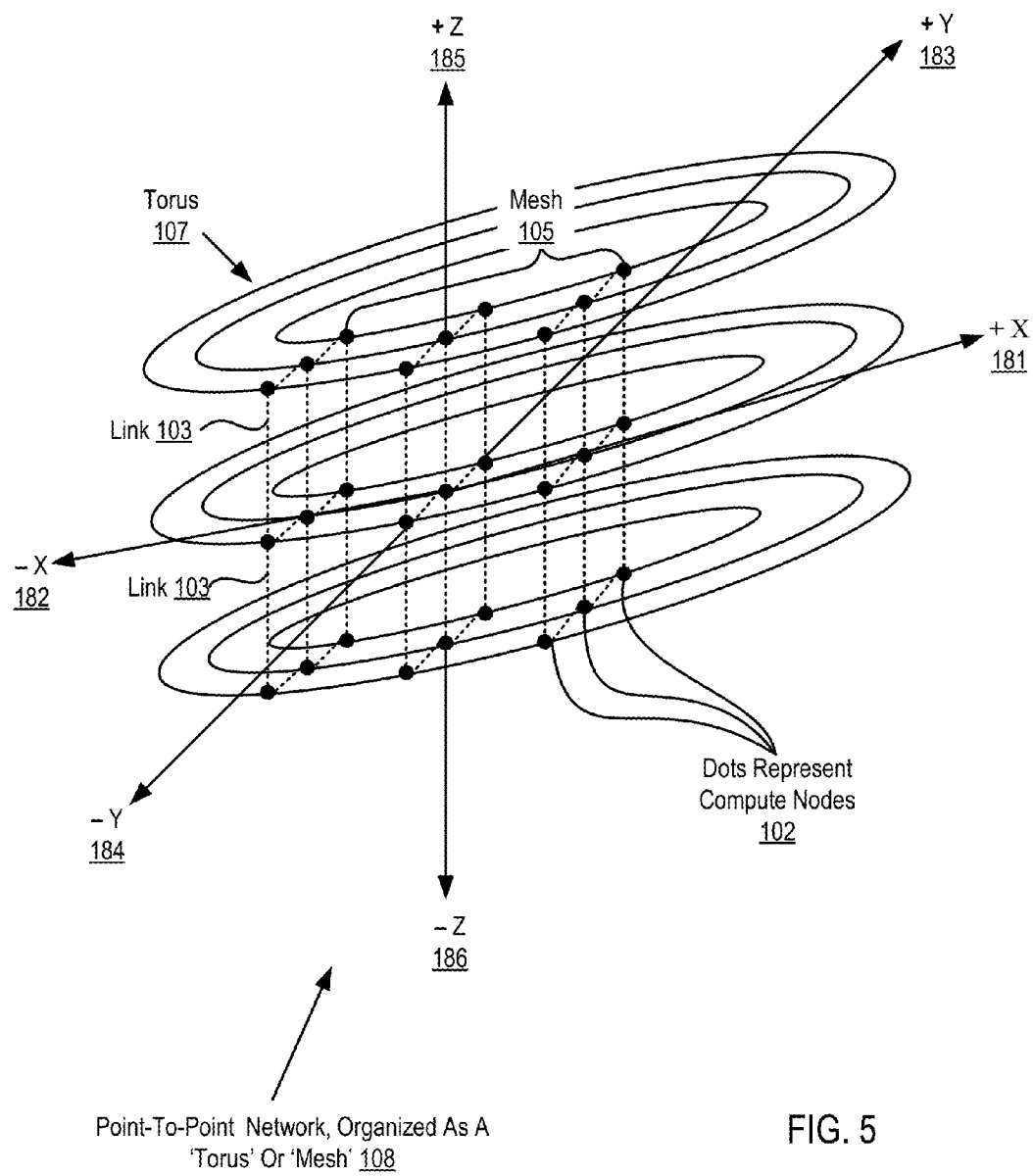
FIG. 5 sets forth a line drawing illustrating an example data communications network optimized for point-to-point operations useful in systems capable of distributing an executable job load file to compute nodes in a parallel computer according to embodiments of the present invention.

For further explanation, FIG. 5 sets forth a line drawing illustrating an example data communications network (108) optimized for point-to-point operations useful in systems capable of distributing an executable job load file to compute nodes in a parallel computer according to embodiments of the present invention. In the example of FIG. 5, dots represent compute nodes (102) of a parallel computer, and the dotted lines between the dots represent data communications links (103) between compute nodes. The data communications links are implemented with point-to-point data communications adapters similar to the one illustrated for example in FIG. 3, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 5 is illustrated with only 27 compute nodes, but readers will recognize that a data communications network optimized for point-to-point operations for use in distributing an executable job load file to compute nodes in a parallel computer in accordance with embodiments of the present invention may contain only a few compute nodes or may contain thousands of compute nodes. For ease of explanation, the data communications network of FIG. 5 is illustrated with only three dimensions, but readers will recognize that a data communications network optimized for point-to-point operations for use in distributing an executable job load file to compute nodes in a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 6:
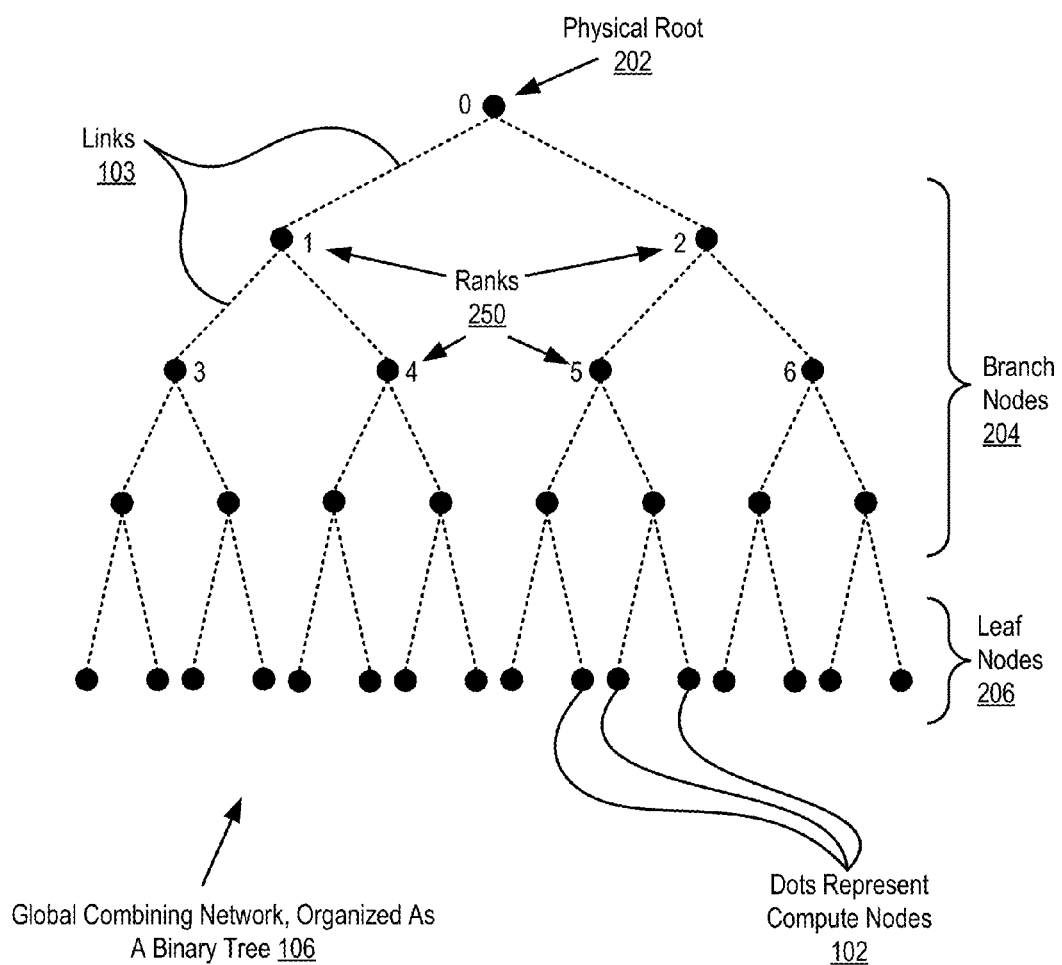
FIG. 6 sets forth a line drawing illustrating an example global combining network useful in systems capable of distributing an executable job load file to compute nodes in a parallel computer according to embodiments of the present invention.

For further explanation, FIG. 6 sets forth a line drawing illustrating an example global combining network (106) useful in systems capable of distributing an executable job load file to compute nodes in a parallel computer according to embodiments of the present invention. The example data communications network of FIG. 6 includes data communications links (103) connected to the compute nodes so as to organize the compute nodes as a tree. In the example of FIG. 6, dots represent compute nodes (102) of a parallel computer, and the dotted lines (103) between the dots represent data communications links between compute nodes. The data communications links are implemented with global combining network adapters similar to the one illustrated for example in FIG. 4, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 6 is illustrated with only 31 compute nodes, but readers will recognize that a global combining network (106) optimized for collective operations for use in distributing an executable job load file to compute nodes in a parallel computer in accordance with embodiments of the present invention may contain only a few compute nodes or may contain thousands of compute nodes.

In the example of FIG. 6, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 7:
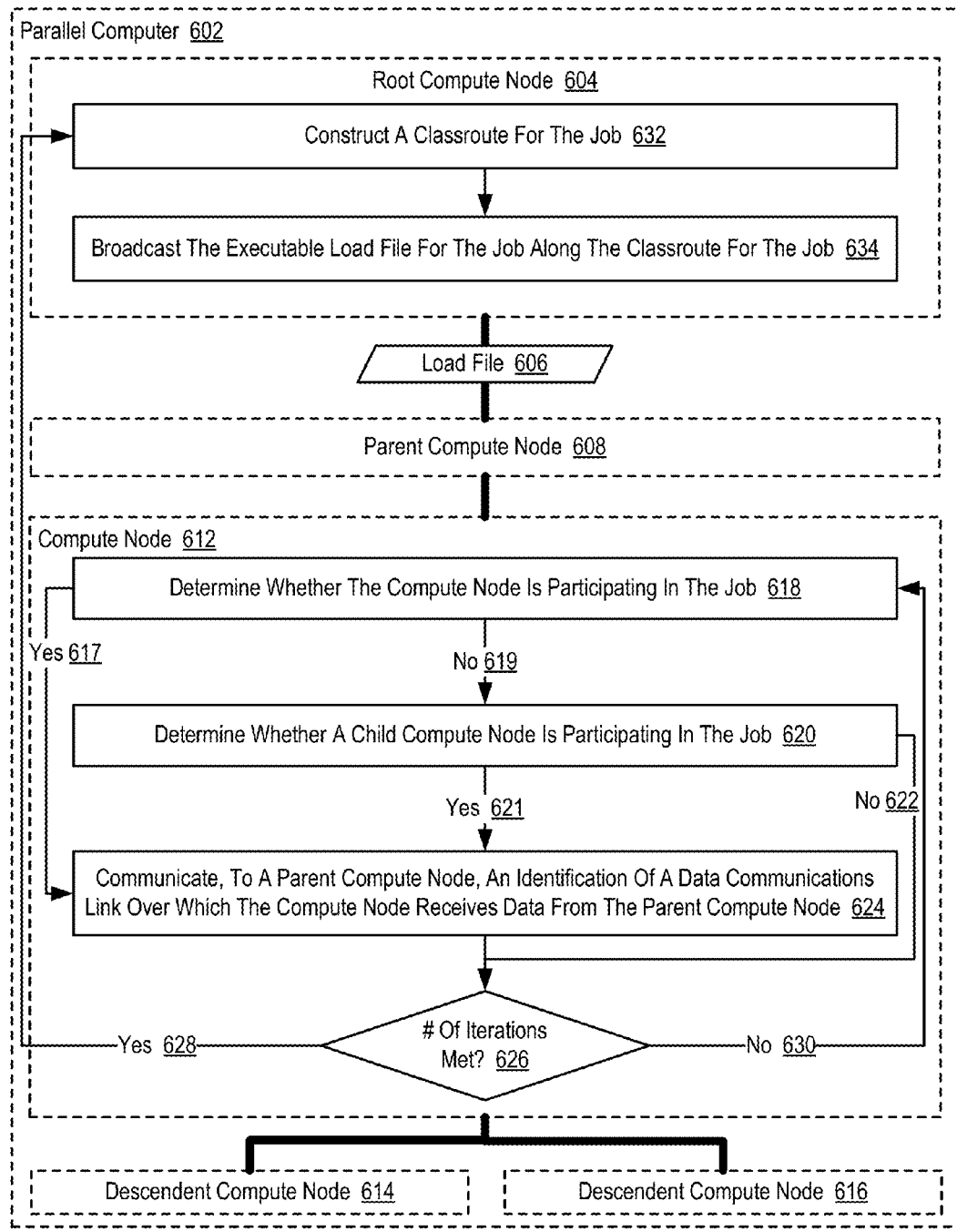
FIG. 7 sets forth a flow chart illustrating an example method for distributing an executable job load file to compute nodes in a parallel computer according to embodiments of the present invention.

For further explanation, FIG. 7 sets forth a flow chart illustrating an example method for distributing an executable job load file (606) to compute nodes in a parallel computer (602) according to embodiments of the present invention. The parallel computer (602) of FIG. 7 includes a plurality of compute nodes (604, 608, 612, 614, 616) coupled for data communications over one or more data communications networks as illustrated above with reference to FIG. 1. In the example method of FIG. 7, the compute nodes (604, 608, 612, 614, 616) may be coupled for data communications over data communications network such as an Ethernet network, a global combining network, a JTAG network, a point-to-point network, or any combination thereof as described above.

In the example method of FIG. 7, the compute nodes (604, 608, 612, 614, 616) may be logically organized into a tree structure such as a binary tree. In such an example, one of the compute nodes may be identified as being the root compute node (604) representing the logical root of the tree.

One of the compute nodes may also identified as being a parent compute node (608), as that compute node (608) can represent the logical parent of compute node (612). Likewise, two compute nodes are identified as being descendent compute nodes (614, 616), as the descendent compute nodes (614, 616) can represent the logical children of compute node (612). As such, the designation of specific nodes as being a 'parent,' a 'child,' or a 'descendent' is a relative designation of the logical relationship between the designated nodes and compute node (612).

In the example method of FIG. 7, one or more of the compute nodes (604, 608, 612, 614, 616) may participate in the execution of a particular job. In order to participate in the execution of a particular job, a compute node (604, 608, 612, 614, 616) may need to receive an executable job load file (606) that enables the compute node to load the necessary code and data needed to participate in the execution of the particular job. The executable job load file (606) may include, for example, computer program instructions needed to participate in the execution of the job, data needed to participate in the execution of the job, and so on. In such a way, a compute node may utilize the executable job load file (606) to configure the compute node for participation in the execution of a job. Readers will appreciate that each compute node that is participating in the execution of a particular job may therefore need to receive the executable job load file (606) prior to participating in the execution of the job.

The example method of FIG. 7 includes determining (618), by a compute node (612) in the parallel computer (602), whether the compute node (612) is participating in a job. In the example method of FIG. 7, the job may represent some computing task that is distributed over a plurality of compute nodes (608, 612, 614, 616) such that each compute node (608, 612, 614, 616) participating in the job carries out some portion of the job. Each compute node (608, 612, 614, 616) can determine whether it is participating in the execution of a particular job by examining an identifier associated with the job. In such an example, when a particular compute node (608, 612, 614, 616) is booted, the compute node (608, 612, 614, 616) may be booted with information identifying one or more jobs that the compute node (608, 612, 614, 616) will participate in executing. As such, determining (618) whether the compute node (612) is participating in the execution of a particular job may be carried out by the compute node (612) comparing a list of identifiers for jobs that the compute node (612) will participate in executing to an identifier for the particular job.

The example method of FIG. 7 also includes determining (620), by the compute node (612) in the parallel computer (602), whether a descendent compute node (614, 616) is participating in the job. In the example method of FIG. 7, a descendent compute node (614, 616) may represent a child of the compute node (612), a grandchild of the compute node (612), and so on. As described above, each compute node may determine whether it is participating in the execution of a particular job by comparing a list of identifiers for jobs that the compute node will participate in executing to an identifier for the particular job. Each descendent compute node (614, 616) may therefore notify its parent that the descendent compute node (614, 616) will be or will not be participating in the execution of the particular job. Each descendent compute node (614, 616) may notify its parent that the descendent compute node (614, 616) will be or will not be participating in the execution of the particular job, for example, by sending a message to its parent node, by writing a value to a flag stored at a predetermined address in shared memory that indicates whether a node is participating in the execution of the particular job, and so on. In such a way, determining (620) whether a descendent compute node (614, 616) is participating in the job may be carried out by the compute node (612) monitoring a message queue, shared memory, or other communications channel for an indication from the descendent compute node (614, 616) that the descendent compute node (614, 616) is or is not participating in the execution of the particular job.

The example method of FIG. 7 also includes communicating (624), by the compute node (612) to a parent compute node (608), an identification of a data communications link over which the compute node (612) receives data from the parent compute node (608). In the example method of FIG. 7, communicating (624) an identification of a data communications link over which the compute node (612) receives data from the parent compute node (608) may be carried out by the compute node (612) sending a message to the parent compute node (608) that includes an identifier of the of a data communications link over which the compute node (612) receives data from the parent compute node (608), by the compute node (612) writing a value to a predetermined address in memory that is shared with the parent compute node (608), where the value includes an identifier of the of a data communications link over which the compute node (612) receives data from the parent compute node (608), and so on.

In the example method of FIG. 7, communicating (624) an identification of a data communications link over which the compute node (612) receives data from the parent compute node (608) may be carried out in response to affirmatively (617) determining that the compute node (612) is participating in the job or in response to affirmatively (619) determining that one or more of the descendent compute nodes (614, 616) is participating in the job. In an example in which the compute node (612) is participating in the job, the compute node (612) will need to receive the executable job load file (606) to configure the compute node (612) for participation in executing the job. Likewise, in an example in which one or more of the descendent compute nodes (614, 616) is participating in the job, the compute node (612) will need to receive the executable job load file (606) for subsequent transmission to the one or more of the descendent compute nodes (614, 616) participating in the job. As such, the compute node (612) will need to receive the executable job load file (606) when the compute node (612) is participating in the job or when one or more of the descendent compute nodes (614, 616) is participating in the job. By communicating (624) an identification of a data communications link over which the compute node (612) receives data from the parent compute node (608), the compute node (612) can identify a communications link over which the parent compute node (608) may later transmit the executable job load file (606) to the compute node (612). In the example method of FIG. 7, steps 618, 620, and 624 are carried out iteratively for a predetermined number of iterations. The iterative nature of steps 618, 620, and 624 will be explained in greater detail below, specifically with reference to an example described below and depicted in FIG. 8.

The example method of FIG. 7 also includes constructing (632) a class route for the job. In the example method of FIG. 7, the class route can identify all compute nodes participating in the job, as well as the data communications links between the compute nodes participating in the job. In such an example, constructing (632) a class route for the job may therefore be carried out by identifying all compute nodes that are either participating in the execution of the job or have descendant compute nodes that are participating in the execution of the job. In such an example, all compute nodes that are either participating in the execution of the job or have descendant compute nodes that are participating in the execution of the job may therefore be part of a sub-network of compute nodes in the parallel computer that comprise the members of the class route. A class route identifier may be associated with each distinct class route such that messages that are broadcast by the root node can include a class route identifier in a message header, identifying which compute nodes are to receive and process the message. Each compute node in the parallel computer may include a routing table that associates a class route identifier with one or more egress ports on the compute node for forwarding a message received by the compute node that includes the class route identifier, such that the message is only broadcast to the members of the corresponding class route.

The example method of FIG. 7 also includes broadcasting (634) the executable load file (606) for the job along the class route for the job. In the example method of FIG. 7, broadcasting (634) the executable load file (606) for the job along the class route for the job may be carried out by the root compute node (604) generating a broadcast message that includes the executable load file (606) as message payload and also includes a class route identifier in the message header. In such an example, the root compute node (604) may send the broadcast message to its children, which will subsequently determine which egress port through which to forward the message using the class route identifier and an internal routing table. As this process is repeated, the broadcast message will be passed along to each of the compute nodes that are members of the class route associated with the class route identifier.

Figure 8:
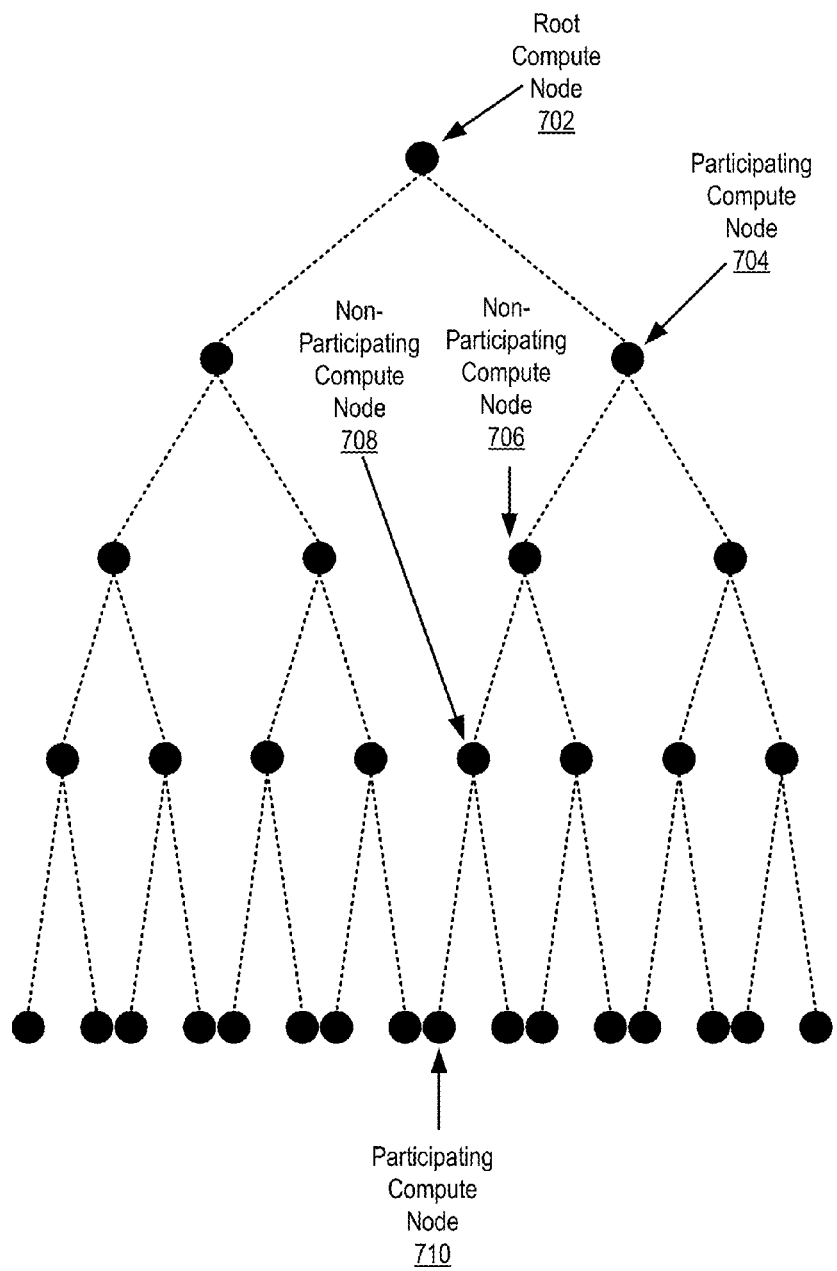
FIG. 8 sets forth an example of a parallel computer where the compute nodes in the parallel computer are logically organized into a binary tree according to embodiments of the present invention.

For further explanation, FIG. 8 sets forth an example of a parallel computer where the compute nodes in the parallel computer are logically organized into a binary tree. The example depicted in FIG. 8 specifically identifies five compute nodes in the parallel computer. One compute node of the parallel computer that is specifically identified in FIG. 8 is the root compute node (704), which represents the logical root of the binary tree. The remaining compute nodes of the parallel computer that are specifically identified are participating compute nodes (704, 710) and non-participating compute nodes (706, 708). In the example depicted in FIG. 8, participating compute nodes (704, 710) represent compute nodes that are participating in the execution of a job. The non-participating compute nodes (706, 708) depicted in FIG. 8 represent compute nodes that are not participating in the execution of the job. As mentioned above, steps 618, 620, and 624 of FIG. 7 are carried out iteratively for a predetermined number of iterations. The iterative nature of steps 618, 620, and 624 of FIG. 7 will be explained with reference to the example depicted in FIG. 8.

In a first iteration of steps 618, 620, and 624 of FIG. 7, each of the non-root compute node (704, 706, 708, 710) determines (618 of FIG. 7) whether it is participating in the execution of a job. In the example depicted in FIG. 8, the participating compute nodes (704, 710) will determine that they are participating in the execution of the job and the non-participating compute nodes (706, 708) will determine that they are not participating in the execution of the job. Each of the non-root compute nodes (704, 706, 708, 710) will subsequently determine (620 of FIG. 7) whether any of its descendant compute nodes are participating in the execution of the job. During the first iteration, however, none of the compute nodes (704, 706, 708, 710) will have received a notification that one of their descendant compute nodes are participating in the execution of the job. Each of the non-root compute nodes (704, 706, 708, 710) will then communicate (624 of FIG. 7), to its parent compute node, an identification of a data communications link over which the compute node receives data from the parent compute node in response to affirmatively determining that the compute node is participating in the job or in response to affirmatively determining that one or more of the child nodes is participating in the job. In the example depicted in FIG. 8, participating compute node (704) will therefore communicate an identification of a data communications link over which participating compute node (704) receives data from its parent compute node, which is the root compute node (702). Likewise, participating compute node (710) will communicate an identification of a data communications link over which participating compute node (710) receives data from its parent compute node, which is the non-participating compute node (708). In such an example, the non-participating compute nodes (706, 708) will communicate an identification of a data communications link to a parent compute node as neither node is participating in the execution of the job nor is either compute node aware that a descendant compute node is participating in the execution of the job.

In a second iteration of steps 618, 620, and 624 of FIG. 7, each of the non-root compute nodes (704, 706, 708, 710) determines (618 of FIG. 7) whether it is participating in the execution of a job as described above. Each of the non-root compute nodes (704, 706, 708, 710) will subsequently determine (620 of FIG. 7) whether any of its descendant compute nodes are participating in the execution of the job. During the second iteration, non-participating compute node (708) will have received a notification that one of its descendant compute nodes, participating computing node (710), is participating in the execution of the job. Each of the non-root compute nodes (704, 706, 708, 710) will then communicate (624 of FIG. 7), to its parent compute node, an identification of a data communications link over which the compute node receives data from the parent compute node if the compute node is participating in the job or if one or more of the descendant nodes is participating in the job. In the example depicted in FIG. 8, the participating compute nodes (704, 710) will again communicate an identification of a data communications link over which participating compute nodes (704, 710) receive data from its parent compute node. In addition, non-participating compute node (708) will also communicate an identification of a data communications link over which the non-participating compute node (708) receives data from its parent compute node, which is non-participating compute node (706). The non-participating compute node (708) will communicate an identification of a data communications link over which the non-participating compute node (708) receives data from non-participating compute node (706) by virtue of non-participating compute node (708) determining that one of its descendant compute nodes is participating in the execution of the job.

In a third iteration of steps 618, 620, and 624 of FIG. 7, each of the non-root compute nodes (704, 706, 708, 710) determines (618 of FIG. 7) whether it is participating in the execution of a job as described above. Each of the non-root compute nodes (704, 706, 708, 710) will subsequently determine (620 of FIG. 7) whether any of its descendant compute nodes are participating in the execution of the job.

During the third iteration, non-participating compute node (706) will have received a notification that one of its descendent compute nodes, participating computing node (710), is participating in the execution of the job. Each of the non-root compute nodes (704, 706, 708, 710) will then communicate (624 of FIG. 7), to its parent compute node, an identification of a data communications link over which the compute node receives data from the parent compute node if the compute node is participating in the job or if one or more of the descendant nodes is participating in the job. In the example depicted in FIG. 8, the compute nodes (704, 708, 710) will again communicate an identification of a data communications link over which the compute nodes (704, 708, 710) receive data from its parent compute node. In addition, non-participating compute node (706) will also communicate an identification of a data communications link over which the non-participating compute node (706) receives data from its parent compute node, which is participating compute node (704). The non-participating compute node (706) will communicate an identification of a data communications link over which the non-participating compute node (706) receives data from participating compute node (704) by virtue of non-participating compute node (706) determining that one of its descendent compute nodes is participating in the execution of the job.

Upon completion of the steps described above, the method depicted in FIG. 7 would continue by constructing (632 of FIG. 7) a class route for the job that includes the data communications link between root compute node (702) and participating compute node (704), the data communications link between participating compute node (704) and non-participating compute node (706), the data communications link between non-participating compute node (706) and non-participating compute node (708), and the data communications link between non-participating compute node (708) and participating compute node (710). The method of FIG. 7 would continue by subsequently broadcasting (634 of FIG. 7) the executable load file (606 of FIG. 7) for the job along the class route for the job.

Readers will appreciate that in this example, after three iterations, each compute node that has a descendant that is participating in the execution of the job will have been notified that it has a descendant that is participating in the execution of the job. In an example in which only leaf compute nodes in a binary tree were participating in the execution of the job, filtering a notification to each compute node in the path of each participating leaf compute node would require a number of iterations that is equal to the number of hops between a participating leaf compute node and a root compute node. That is, filtering a notification to each compute node in the path of each participating leaf compute node would require a number of iterations that is equal to the number of compute nodes that are ancestors of a participating leaf compute node. In such a way, the predetermined number of iterations may be determined in dependence upon a depth of the binary tree.

Figure 9:
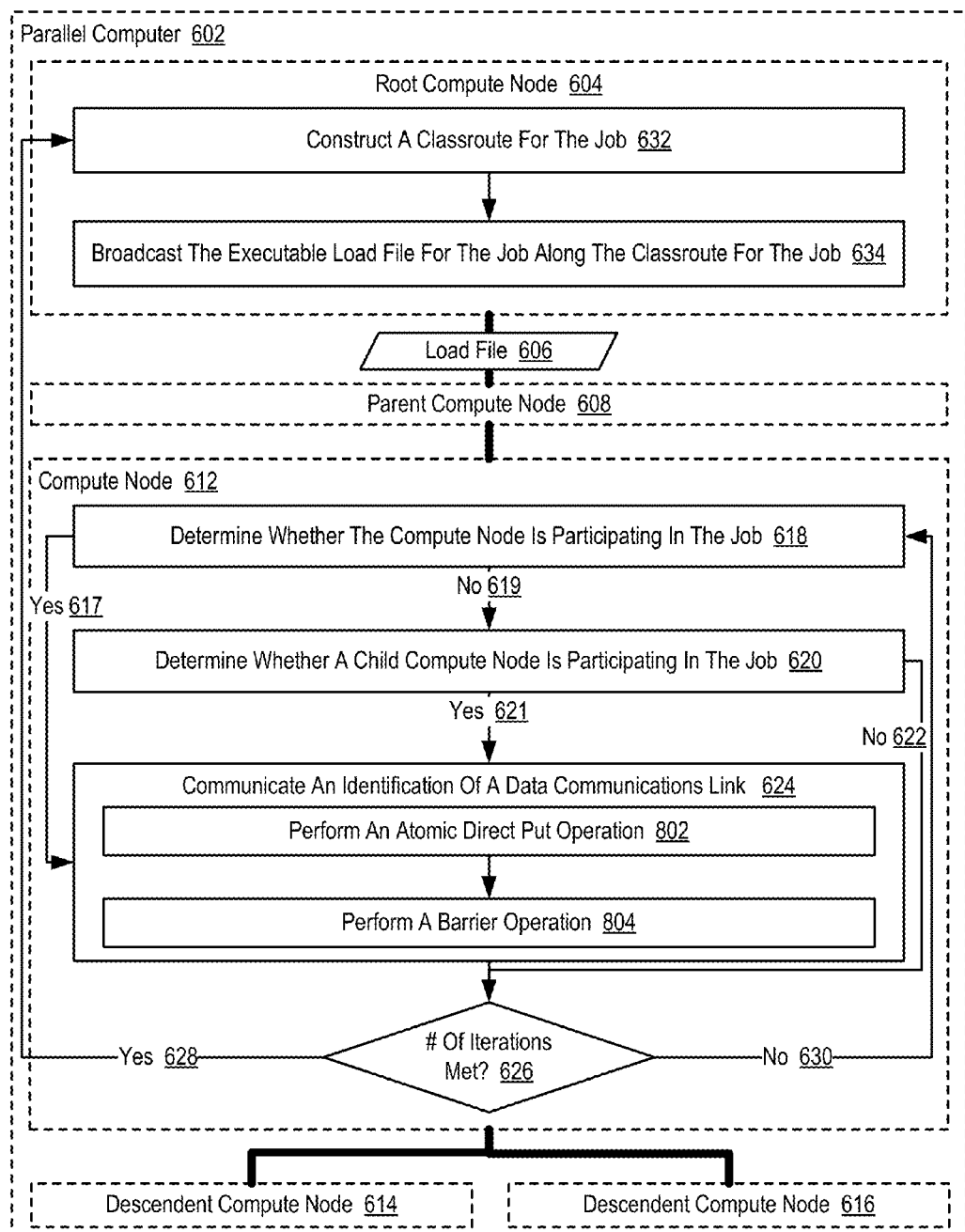
FIG. 9 sets forth a flow chart illustrating an additional example method for distributing an executable job load file to compute nodes in a parallel computer according to embodiments of the present invention.

For further explanation, FIG. 9 sets forth a flow chart illustrating an additional example method for distributing an executable job load file to compute nodes in a parallel computer according to embodiments of the present invention. The example method of FIG. 9 is similar to the example method of FIG. 7 as it also includes determining (618) whether the compute node (612) is participating in the job, determining (620) whether a descendent compute node (614, 616) is participating in the job, communicating (624) an identification of a data communications link over which the compute node (612) receives data from the parent compute node (608), constructing (632) a class route for the job, and broadcasting (634) the executable load file (606) for the job along the class route for the job.

In the example method of FIG. 9, each compute node (604, 608, 612, 614, 616) in the parallel computer (602) may maintain a participation vector. Such a participation vector may be embodied as a data structure used to identify which compute nodes that are connected to the compute node (612) maintaining the participation vector are participating in the execution of a job. In such an example, each compute node (604, 608, 612, 614, 616) may maintain its own participation vector, where each entry in the participation vector is associated with a communications link between the compute node (604, 608, 612, 614, 616) that maintains the participation vector and another compute node (604, 608, 612, 614, 616). In such an example, each value in the participation vector may indicate whether the compute node (604, 608, 612, 614, 616) on the other end of the communications link is a compute node (604, 608, 612, 614, 616) participating in the execution of the job.

In the example method of FIG. 9, communicating (624) an identification of a data communications link over which the compute node (612) receives data from the parent compute node (608) can include performing (802), by the compute node (612), an atomic direct put operation. In the example method of FIG. 9, a direct put operation may be an operation that writes data to a specific location in memory. The direct put operation of FIG. 9 is atomic in the sense that the operation completes in a unit of time that is indivisible, such as a single processor cycle, such that an atomic operation is performed entirely or not performed at all.

In the example method of FIG. 9, performing (802) an atomic direct put operation may be carried out by the compute node (612) writing a value to a location in memory of the parent compute (608). For example, the compute node (612) may write a value indicating that the compute node (612) or one of its descendant compute nodes (614, 616) is participating in the execution of a job to a location in memory of the parent compute (608), such as a location in memory where the parent compute node (608) stores its participation vector. In such a way, the compute node (612) may update the participation vector of its parent compute node (608) to indicate that the compute node (612) or one of its descendant compute nodes (614, 616) is participating in the execution of the job.

In the example method of FIG. 9, communicating (624) an identification of a data communications link over which the compute node (612) receives data from the parent compute node (608) can also include performing (804) a barrier operation after the atomic direct put operation. In the example method of FIG. 9, a barrier operation represents a type of synchronization amongst a group of processes in which each process must stop executing upon reaching a particular point. Only when all processes reach the same point of execution and stop is the barrier operation complete and the processes may continue executing. Barrier operations in a parallel computer that includes many compute nodes, each of which may be executing a number of processes, may be carried out locally, with tasks on a single compute node and globally amongst many tasks of many compute nodes.

In the example method of FIG. 9, each of the compute nodes that are performing the steps depicted in FIG. 9 may perform (804) a barrier operation as part of communicating (624) an identification of a data communications link over which the compute node (612) receives data from the parent compute node (608). In such a way, each of the compute nodes that are performing the steps depicted in FIG. 9 can complete the step of communicating (624) an identification of a data communications link over which the compute node (612) receives data from the parent compute node (608) prior to moving execution flow to step 626.

Figure 10:
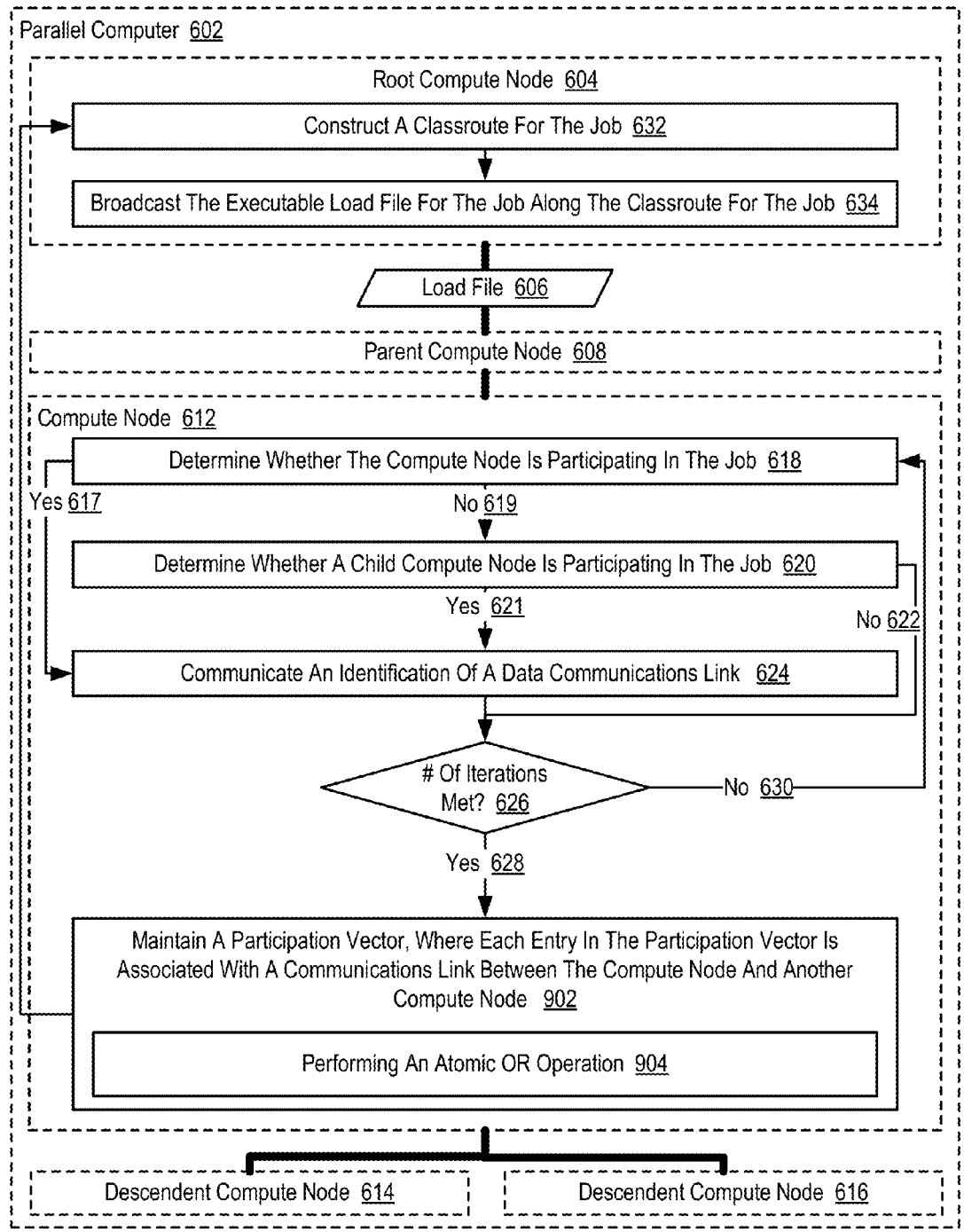
FIG. 10 sets forth a flow chart illustrating an additional example method for distributing an executable job load file to compute nodes in a parallel computer according to embodiments of the present invention.

For further explanation, FIG. 10 sets forth a flow chart illustrating an additional example method for distributing an executable job load file to compute nodes in a parallel computer according to embodiments of the present invention. The example method of FIG. 10 is similar to the example method of FIG. 7 as it also includes determining (618) whether the compute node (612) is participating in the job, determining (620) whether a descendent compute node (614, 616) is participating in the job, communicating (624), to a parent compute node (608), an identification of a data communications link over which the compute node (612) receives data from the parent compute node (608), constructing (632) a class route for the job, and broadcasting (634) the executable load file (606) for the job along the class route for the job.

The example method of FIG. 10 also includes maintaining (902), by each compute node in the parallel computer, a participation vector. As described above, the participation vector may be embodied as a data structure used to identify which compute nodes that are connected to the compute node (612) maintaining the participation vector are participating in the execution of a job. In such an example, each compute node (604, 608, 612, 614, 616) may maintain its own participation vector, where each entry in the participation vector is associated with a communications link between the compute node (604, 608, 612, 614, 616) that maintains the participation vector and another compute node (604, 608, 612, 614, 616). In such an example, each value in the participation vector may indicate whether the compute node (604, 608, 612, 614, 616) on the other end of the communications link is a compute node (604, 608, 612, 614, 616) participating in the execution of the job. In the example method of FIG. 10, maintaining (902) a participation vector may be carried out by each compute node (604, 608, 612, 614, 616) in the parallel computer (602) storing a data structure, for example, in memory of the particular compute node (604, 608, 612, 614, 616) that is maintaining (902) the participation vector or in memory that is otherwise accessible to the particular compute node (604, 608, 612, 614, 616) that is maintaining (902) the participation vector.

Consider an example in which a particular compute node (612) is coupled for data communications with five other compute nodes via a point-to-point adapter that is similar to the point-to-point adapter depicted in FIG. 3. In such an example, assume that compute node (612) is coupled for data communications with each of the other compute nodes via an ingress link for incoming communications and a separate egress link for outgoing communications. The participation vector maintained by each compute node may therefore include ten bits—one bit for the ingress link and one bit for the egress link that couples the compute node to each of the five other compute nodes. In such an example, a value of '1' in a particular bit location within the participation vector may indicate that the compute node on the other end of the communications links associated with the bit location in the participation vector is participating in the execution of the job—and that the communications link associated with the bit location in the participation vector is the communications link over which the participating compute node receives data from its logical parent. In view of the fact that the compute nodes in the example of FIG. 10 are logically organized into a binary tree, one of the five other compute nodes that the particular compute node (612) is coupled for data communications with represents a parent compute node (608). Furthermore, at most two of the five other compute nodes that the particular compute node (612) is coupled for data communications with represent child compute nodes, which are characterized here as descendent compute nodes (614, 616).

In the example method of FIG. 10, maintaining (902) a participation vector can include performing (904) an atomic OR operation. In the example method of FIG. 10, a subject compute node will be part of the class route for a job if the subject compute node is participating in the execution of the job or if a descendent compute node of the subject compute node is participating in the execution of the job. When a descendent compute node of the subject compute node is participating in the execution of the job, the descendent compute node may send a bit pattern to the subject compute node indicating which data communications link of the subject application should utilize for sending a load file to the descendent compute node. Because the subject compute node can include more than one descendent compute node, the subject compute node may receive such a bit pattern from multiple descendent compute nodes.

Consider an example in which the subject compute node includes a point-to-point adapter as depicted in FIG. 3. In such an example, assume that the subject compute node therefore maintains (902) a 10 bit participation vector, where each of the 10 data communications links over which the point-to-point adapter may facilitate data communications is associated with a particular bit in the 10 bit participation vector. In such an example, a first descendent compute node may send a bit pattern of '0100000000' to the subject compute node, where the value of '1' in the second bit indicates that the subject compute node should send a load file to the first descendent compute node over a data communications link associated with the second position of the bit pattern. A second compute node, however, may send a bit pattern of '0001000000' to the subject compute node, where the value of '1' in the fourth bit indicates that the subject compute node should send a load file to the second descendent compute node over a data communications link associated with the fourth position of the bit pattern. In such a way, maintaining (902) a participation vector can include performing (904) an atomic OR operation on the bit patterns received from each descendent compute node, resulting in a participation vector of '0101000000.' In such an example, the values of '1' in the second and fourth bit positions can indicate that the subject compute node should broadcast the load file over the communications links associated with the second and fourth bit positions of the participation vector.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of distributing an executable job load file to compute nodes in a parallel computer, the parallel computer comprising a plurality of compute nodes coupled for data communications over a data communications network, the method comprising:
   iteratively for a predetermined number of iterations:
      determining, by a compute node in the parallel computer, whether the compute node is participating in a job;
      determining, by the compute node in the parallel computer, whether a descendant compute node is participating in the job;
      responsive to determining that the compute node is participating in the job or that the descendant compute node is participating in the job, communicating, by the compute node to a parent compute node, an identification of a data communications link over which the compute node receives data from the parent compute node;
   constructing a class route for the job, wherein the class route identifies all compute nodes participating in the job and all data communications links between each of the compute nodes participating in the job, wherein each compute node in the parallel computer includes a routing table that associates a class route identifier with one or more egress ports on the compute node for forwarding a message received by the compute node that includes the class route identifier; and broadcasting the executable load file for the job along the class route for the job, wherein the executable load file is included in a message that also includes a class route identifier for the job, including identifying, by each compute node participating in the job, from the routing table in the compute node, an egress port within the compute node to utilize when forwarding the message.

2. The method of claim 1 wherein the plurality of compute nodes in the parallel computer are organized into a binary tree and the predetermined number of iterations is determined in dependence upon a depth of the binary tree.

3. The method of claim 1 wherein communicating, by the compute node to the parent compute node, the identification of the data communications link over which the compute node receives data from the parent compute node further comprises performing, by the compute node, an atomic direct put operation.

4. The method of claim 3 further comprising performing a barrier operation after the atomic direct put operation.

5. The method of claim 1 further comprising maintaining, by each compute node in the parallel computer, a participation vector, wherein each entry in the participation vector is associated with a communications link between the compute node and another compute node.

6. The method of claim 5 wherein maintaining, by each compute node in the parallel computer, a participation vector further comprises performing an atomic OR operation.

\* \* \* \* \*